Patented Apr. 29, 1947

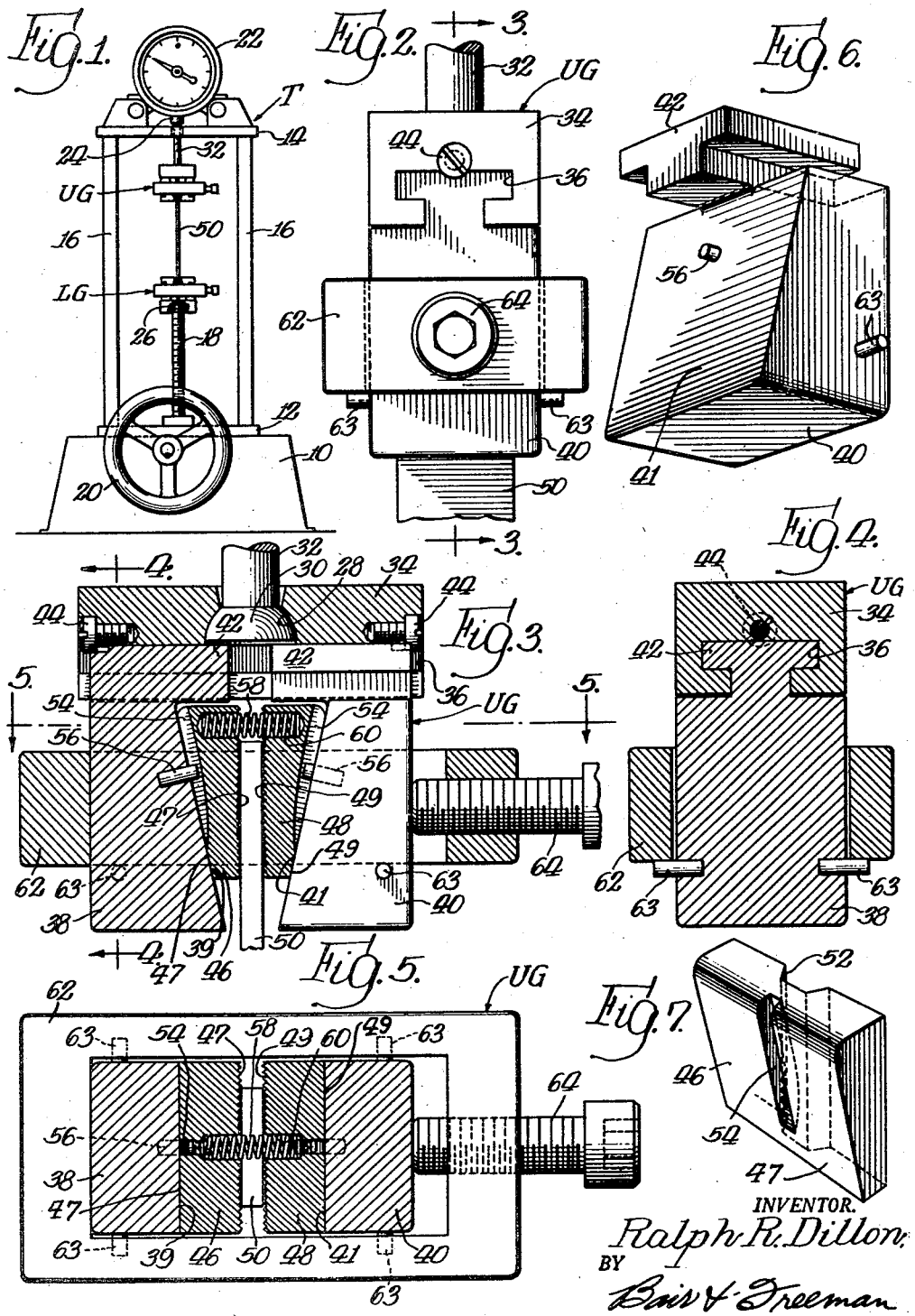

2,419,711

UNITED STATES PATENT OFFICE 2,419,711

GRIP FOR TENSILE TESTING

Ralph R. Dillon, Chicago, Ill., assignor to W. C. Dillon & Company, Inc., Chicago, Ill., a corporation of Illinois Application February 14, 1944, Serial No. 522,262

10 Claims. (Cl. 24—136)

My present invention relates to grips for tensile testing and for tests of any kind where a good mechanical hold is desired between the grip and another element such as a specimen being tested.

One object of the invention is to provide a grip structure that is comparatively light and simple in construction, yet which effectively grips a specimen so as to apply a heavy load thereto without the necessity of the grip being excessively large.

Another object is to provide grips that can be made small due to the arrangement of a clamp band around the grips for imparting thereto the initial bite on the specimen being tested.

Still another object is to provide a grip that consists of a pair of holders and a base on which they are slidably mounted, together with interchangeable jaws in the holders and a clamp band for coaction with the holders.

With these and other objects in view, my invention consists in the construction, arrangement and combination of the various parts of my grips whereby the objects contemplated are attained, as hereinafter more fully set forth, pointed out in my claims and illustrated in the accompanying drawings, wherein:

Figure 1 is a front elevation of a tensile tester showing my grips associated therewith for testing a specimen under tension.

Figure 2 is a full size end elevation of the upper grip in Figure 1, this size being suitable for loads up to 10,000 pounds.

Figure 3 is a vertical sectional view on the line 3—3 of Figure 2 with screw and one holder in elevation.

Figure 4 is a vertical sectional view on the line 4—4 of Figure 3.

Figure 5 is a sectional view on the line 5—5 of Figure 3 and showing the parts on a reduced scale; and, Figures 6 and 7 are perspective views of a holder and jaw respectively of my grip structure.

On the accompanying drawing I have used the reference character T to indicate in general a tensile tester. The tester may consist of a base 10, lower and upper platens 12 and 14 connected by uprights 16, and a loading screw 18. The loading screw is moved vertically by means of a hand wheel 20 through suitable step down gearing and a nut (details of which are not illustrated as they form no part of my present invention). On the platen 14, an indicator 22 such as a dynamometer is mounted, and it has a vertically movable pin 24 which, when a load is applied to it for moving it downwardly, will indicate the pull.

I have shown in Figure 1 a pair of grips embodying my present invention, the lower one being indicated LG and the upper one UG. The grips LG and UG are similar in construction throughout with the exception of the lower grip LG having a threaded socket 26 for mounting it rigidly on the loading screw 18 whereas the upper grip has a spherical socket 28 in which a semi-ball head 30 of a screw 32 seats. The screw 32 threads into the pin 24 of the dynamometer 22.

Since the remaining elements of the grips are identical in construction I will describe but one of them in detail; to-wit, the upper grip.

The grip includes a base member 34 which consists of a rectangular block of steel having therein a guide way 36. The guide way extends longitudinally of the base and is T-shaped in outline as shown in Figure 4. A pair of holders 38 and 40 which are identical in construction are slidably mounted on the base 34 and are provided with inclined jaw engaging faces 39 and 41. Each of the holders has a T-shaped head 42 which slidingly fits in the guide way 36 of the base so that they may freely slide therein, but are held in proper alignment at all times by coaction of the T-heads and guide ways. To retain the holders in position after they are assembled, stop screws 44 are screwed into the ends of the base.

The inclined faces 39 and 41 of the holders 38 and 40 converge toward the direction that the load is applied; to-wit, downwardly in Figure 3. A pair of jaws 46 and 48 are inserted loosely between the faces and have inclined backs 47 and 49 to fit the faces. The adjacent gripping faces of the jaws are indicated at 47 and 49. These are preferably serrated and as shown in Figure 3 are flat faces for the gripping of a specimen 50 having parallel faces such as a flat bar. The grips may have other-than-flat faces as shown in Figure 7 wherein the grip 46 has a half hexagon face 52 for gripping a hexagon or round bar. Obviously these faces may be of any desired shape or size for different types of specimens and the jaws are readily removable with respect to the holders so that they can be quickly interchanged.

Each of the jaws 46 and 48 has a vertical groove 54 on its back to coact with a guide pin 56 of the holder. The jaws are thereby retained from getting out of place laterally with respect to the holders, whereas the inclination of the faces 39 and 41 hold them from dropping out of position. A spring 58 has its ends received in sockets 60 of the jaws to normally hold the jaws open and thus facilitate the placing of a specimen between them.

A clamp band 62 surrounds the holders and the jaws and at one end has a set screw 64 threaded therein so that the holders may be moved toward each other. Stop pins 63 are provided for the clamp band for a purpose which will hereinafter appear.

Practical operation

In the operation of my grips, the holders 38 and 40 may be opened to their maximum extent when the set screw 64 is turned all the way out and the grips can then take about a ¼ inch specimen. The upper end of the specimen is inserted between the jaws 46 and 48 of the upper grip, the proper distance being about 1 inch. During this operation the clamp band 62 may be raised to a position surrounding only the upper ends of the jaws so that the specimen can be inserted from the side instead of having to be inserted from below. After the specimen is inserted in the upper grip UG, the set screw 64 is tightened just sufficient to give a firm starting bite.

The specimen is then lined up with the lower grip LG and its lower end placed between the jaws thereof after which the clamp band 62 of the lower grip is raised against the stop pins 63 and its set screw tightened. The stop pins on both grips limit the clamping bands to the most effective positions for engaging the jaws with the specimen and providing a maximum intensity of grip.

When the load is applied to the specimen by rotation of the hand wheel 20 for lowering the load screw 18, the tension on the specimen as it increases will pull the jaws toward the converging ends of the faces 39 and 41 of the holders and thereby increase the grip as the pull increases. The spreading tendency of the jaws against the holders is fully absorbed by the clamp bands 62 without this strain being put on the T-heads 42 and the guide ways 36.

The holders of course should be centered with respect to the base members 34 so that the center of the specimen is centered relative to the loading screw 18 and the bolt 32. If slightly off center, the holders will shift to a centered position, however, when the load is first applied.

After the specimen is tested, the grips may be readily uncoupled relative to the load by slightly loosening the set screws 64 whereupon the jaws 46 and 48 may be pushed toward the diverging ends of the faces 39 and 41 to further loosen the jaws. The specimen may therefore be readily and quickly removed and another one placed in position for testing with the clamp bands 62 readily movable to positions spaced from the stop pins 63, thereby permitting of side insertion of the specimen.

The grips have been illustrated in connection with a tensile tester, but of course may be used wherever it is desirable to clamp two elements relative to each other so that a load can be applied to them. It is desirable for the degree of clamping to increase in proportion to the load and this occurs readily in my grip structure.

A few dimensions have been mentioned and a grip of the size shown in Figures 2, 3 and 4 is suitable for holding against loads of from zero to 10,000 pounds, but obviously the sizes can be increased for higher loads and the jaws modified as, for instance, in Figure 7 to fit shapes other than flat bars and the like. It is evident, however, that compact size and low weight have been attained with a simplicity of construction that makes it possible to take care of great loads without undue strain on the parts. The jaws are self-tightened and give an even starting bite on the specimen. They are also readily interchangeable for different types of specimens.

After testing, it is unnecessary to run the loading screw 18 through a suitable distance to permit end insertion of another specimen, due to the possibility of side loading my grips as already described. This facilitates the testing of specimens so that an economy in time and effort is the result. The foregoing results are obtained and at the same time a grip structure is provided that may be readily operated without jamming for ease in releasing the specimen after it breaks.

Some changes may be made in the construction and arrangement of the parts of my grips without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A grip structure comprising a base, holders slidably mounted thereon and having jaw engaging faces extending away from said base and converging with relation to each other in the direction of load application, the sliding mount of said holders on said base retaining said holders perpendicular to the base at all positions of adjustment, jaws fitting said faces and slidable relative thereto, and a clamp band surrounding said jaws and holders and floatingly mounted thereon.

2. A grip structure comprising a base having a guideway, holders having portions slidably mounted in said guideway for movement of said holders toward and away from each other, said holders having jaw engaging faces facing each other and converging with relation to each other in the direction of load application, jaws fitting said faces and movable thereon, and a band surrounding said jaws and holders.

3. A grip structure comprising a base, holders mounted for sliding movement thereon and both confined to sliding movements only in relation thereto, said holder having jaw engaging faces converging with relation to each other, loose jaws fitting said faces, a clamp band surrounding said jaws and holders and movable on said holders toward and away from said base and means at a fixed distance from said base for limiting the movement of said clamp band away from said base.

4. In a grip structure, a base member having guide ways extending longitudinally thereof, a pair of holders having guide heads slidable in said guide ways and each having a jaw engaging face, said faces converging with relation to each other, jaws fitting said faces and slidable relative thereto, said holders and jaws having slot and pin guide connections for guiding said jaws with relation to said holders, a spring between said jaws tending to force them toward said faces, a clamp band surrounding said jaws and holders and having a set screw for forcing the holders toward each other, and stop means on said holders for limiting the position of said clamp band relative thereto.

5. In a grip structure, a base member having guide ways extending longitudinally thereof, a pair of holders having guide heads slidable in said guide ways and each having a jaw engaging face, said faces converging with relation to each other, jaws fitting said faces and slidable relative thereto, said holders and jaws having slot and pin guide connections for guiding said jaws with relation to said holders, a spring between said jaws tending to force them toward said faces, and a clamp band surrounding said jaws and holders and having a set screw for forcing the holders toward each other.

6. In a grip structure, a base member having guide ways extending longitudinally thereof, a pair of holders having guide heads slidable in said guide ways and each having a jaw engaging face, said faces converging with relation to each other in the direction of load application, jaws fitting said faces and slidable relative thereto, a spring between said jaws tending to force them toward said faces, and a band surrounding said jaws and holders.

7. A grip structure comprising a base member having guide ways extending longitudinally thereof, a pair of holders having guide heads slidable in said guide ways and each having a jaw engaging face, said faces converging with relation to each other in the direction of load application, jaws fitting said faces and slidable relative thereto, and a clamp band surrounding said jaws and holders and having a set screw for forcing the holders toward each other.

8. In a grip structure of the character disclosed, a base, a spherical seat therein, a head seated for universal movement in said seat and having means for connecting the same to a tension device, two holders, each freely slidable on said base and having jaw engaging faces converging with relation to each other in the direction of load application, jaws fitting said faces and slidable relative thereto, and a clamp band surrounding said jaws and holders and having a set screw for forcing the holders toward each other.

9. In a grip structure, a base, a spherical seat therein, a head seated for universal movement in said seat and having means for connecting the same to a tension device, holders slidably mounted on said base, each for free movement independent of the other and having jaw engaging faces converging with relation to each other, jaws fitting said faces, and a band surrounding said jaws and holders.

10. A grip structure comprising a base having a threaded opening to connect with a tension element, a pair of holders slidably mounted on said base and having jaw engaging faces converging with relation to each other in the direction of load application, each of said holders being freely slidable relative to the other, jaws fitting said faces and slidable relative thereto, and a clamp band surrounding said jaws and holders and having a set screw for forcing the holders toward each other.

RALPH R. DILLON.

REFERENCES CITED

The following references are of record in the file of this patent:

UNITED STATES PATENTS

| Number | Name | Date |
| --- | --- | --- |
| 944,141 | Mounts | Dec. 21, 1909 |
| 749,896 | Brown | Jan. 19, 1904 |
| 1,431,928 | Brown | Oct. 17, 1922 |